US008920910B2

(12) United States Patent
Takahashi et al.

(10) Patent No.: US 8,920,910 B2
(45) Date of Patent: Dec. 30, 2014

(54) STRUCTURAL COLOR BODY

(75) Inventors: Masayuki Takahashi, Osaka (JP); Isao Tashiro, Osaka (JP)

(73) Assignee: Panasonic Corporation, Osaka (JP)

(*) Notice: Subject to any disclaimer, the term of this patent is extended or adjusted under 35 U.S.C. 154(b) by 496 days.

(21) Appl. No.: 12/778,260

(22) Filed: May 12, 2010

(65) Prior Publication Data

US 2010/0291358 A1 Nov. 18, 2010

(30) Foreign Application Priority Data

May 18, 2009 (JP) ................................ 2009-119584

(51) Int. Cl.

*B32B 9/00* (2006.01)
*B32B 33/00* (2006.01)
*G02B 5/18* (2006.01)
*B44F 1/02* (2006.01)

(52) U.S. Cl.

CPC ........................................ *B44F 1/02* (2013.01)
USPC ........................ 428/195.1; 428/40.1; 359/566

(58) Field of Classification Search

CPC ................ B44F 1/02; B44F 1/00; B44F 1/08; B44F 7/00; B82Y 20/00; B82Y 25/00; B82Y 10/00; B82Y 30/00; B82Y 40/00; G02F 1/167; G02F 1/09; G02F 2202/32; G02F 1/29; G02F 2001/1678; G02F 1/133533; G02F 1/13338; G02F 1/133514; G02F 1/133719; G02F 1/17; G02F 1/21; G02F 2001/094; G02F 2001/13; B29C 33/424; B29C 45/16; B29C 45/14688; B29L 2011/0083; C09D 7/1291; C09D 5/29; B42D 2033/14; B42D 2035/06; B42D 2035/22; B42D 2035/44; B42D 2035/50; B42D 2037/08; G03H 4/0011; G03H 4/0244; G03H 4/0236; G03H 2001/0497; G03H 2210/54; G03H 2250/36; G03H 2250/40; G02B 5/0236; G02B 5/0257; G02B 5/0284; G02B 5/1861; G02B 5/32

USPC .......................................... 359/566; 428/40.1

See application file for complete search history.

(56) References Cited

U.S. PATENT DOCUMENTS 7,048,307 B1 * 5/2006 Scarbrough et al. ............ 283/41
7,116,464 B2 * 10/2006 Osawa .......................... 359/291
8,040,470 B2 * 10/2011 Kashiwagi .................... 349/106
2004/0032659 A1 2/2004 Drinkwater
2005/0099666 A1 * 5/2005 Kodama et al. ............... 359/237

FOREIGN PATENT DOCUMENTS

JP 2004-151271 5/2004
JP 2004-184725 7/2004
JP 2008-39889 2/2008
WO WO 2007069593 A1 * 6/2007

OTHER PUBLICATIONS

Ghost Buster Cereal Box image; http://www.flickr.com/photos/jasonliebigstuff/3535408660/in/photostream/; 1989.*

"Light and color on the wing: structural colors in butterflies and moths", Helen Ghiradella, Applied Optics, vol. 30 No. 24, Aug. 20, 1991.*

Chinese Office Action (with English translation) issued Nov. 5, 2012 in corresponding Chinese Application No. 201010180759.4.

* cited by examiner

*Primary Examiner* — Mark Ruthkosky
*Assistant Examiner* — Laura C Powers
(74) *Attorney, Agent, or Firm* — Wenderoth, Lind & Ponack, L.L.P.

(57) ABSTRACT

To provide a structural color body that exhibits color using physical phenomena such as reflection, interference, diffraction, and scattering of light, and in which the decorative effect can be further enhanced, the present invention configures a structural color body by combining a plurality of structural color portions that structurally exhibit different colors from each other.

5 Claims, 13 Drawing Sheets

Fig. 3A a1 b1

| | | | | | | | | | |
|---|---|---|---|---|---|---|---|---|---|
| | | | | | | | | | R |
| | | R | | | | | | R | R |
| | | | | | | R | | R | R |
| R | | | | R | R | | R | | |
| | | | R | | R | R | R | R | R |
| | R | R | | R | | R | | | |
| | | | | R | | | R | R | R |

d1 c1

Fig. 3B a1 b1

| | | | | | | | | | |
|---|---|---|---|---|---|---|---|---|---|
| G | | | G | | | G | | G | R |
| | | R | | G | | | | R | R |
| | | | G | | | R | G | R | R |
| R | G | | | R | R | | R | | G |
| G | | G | R | | R | R | R | R | R |
| | R | R | G | R | | R | G | | G |
| G | G | | G | R | G | G | R | R | R |

d1 c1

Fig. 3C a1 b1

| | | | | | | | | | |
|---|---|---|---|---|---|---|---|---|---|
| G | B | B | G | B | B | G | B | G | R |
| B | B | R | B | G | B | B | B | R | R |
| B | B | B | G | B | B | R | G | R | R |
| R | G | B | B | R | R | B | R | B | G |
| G | B | G | R | B | R | R | R | R | R |
| B | R | R | G | R | B | R | G | B | G |
| G | G | B | G | R | G | G | R | R | R |

d1 c1

STRUCTURAL COLOR BODY

RELATED ART

The present invention relates to a structural color body that exhibits color using a physical phenomenon such as reflection, interference, diffraction, and scattering of light.

Various structures are conventionally known for this type of structural color body. For instance, the conventional structural color body described in patent document 1 (Japanese Unexamined Patent Publication No. 2004-151271) is known. FIG. 14 is a cross-sectional view of the conventional structural color body described in patent document 1.

In FIG. 14, a conventional structural color body 101 includes a configuring element 102 having light transmissivity, and a plurality of microscopic configuring elements 103. The plurality of microscopic configuring elements 103 are made of material having an index of refraction different from the configuring element 102, and are regularly arranged in the configuring element 102. The plurality of microscopic configuring elements 103 are arranged at a constant pitch P1 along each plurality of virtual lines A1 inclined by an angle $\theta$1 with respect to an axis in an x direction.

In the conventional structural color body 101 having the above configuration, the structural color body 101 appears as if exhibiting purple-blue color in a case where polyethylene terephtalate (PET) having an average index of refraction of 1.62 is used for a material of the configuring element 102, nylon 6 (Ny6) having an average index of refraction of 1.53 is used for a material of the microscopic configuring element 103, an average diameter D1 of the microscopic configuring element 103 is 0.19 μm, a pitch P1 is 0.28 μm, an angle $\theta$1 is 32°, an incident light L1 is applied at an angle of incidence of $\alpha$1=45°, and visual observation is made at a light receiving angle of $\beta$1=45°. When the structural color body 101 is visually observed with a different light receiving angle $\beta$1, the structural color body 101 appears changed from the purple-blue color to red-green color.

According to the conventional structural color body 101, a color can be expressed without using pigments such as colorant and dye, and thus a pigment application step can be eliminated and manufacturing steps can be reduced, and furthermore, $CO_2$ can be reduced since organic solvent paint does not need to be used.

SUMMARY OF THE INVENTION

However, a decorative effective is limited when the structural color body 101 is used as an outer package component of an electrical device such as camera and television. In other words, the conventional structural color body 101 can, in principle, exhibit an arbitrary color such as red and yellow by changing an arrangement pitch P1 of the plurality of microscopic configuring elements 103. However, the arrangement pitch P1 needs to be adjusted at very high accuracy (smaller than or equal to wavelength of light) to cause the structural color body 101 to exhibit an arbitrary color. Therefore, it is not easy to exhibit the structural color body 101 to an arbitrary color (e.g., expressing an intermediate color of blue and green). Furthermore, although a monotonous color can be expressed in the conventional structural color body 101, different colors cannot be partially expressed.

It is an object of the present invention to solve the above issues, and to provide a structural color body that exhibits color using a physical phenomenon such as reflection, interference, diffraction, and scattering of light, where the decorative effect can be further enhanced.

In order to achieve object, the present invention is configured as described below.

According to a first aspect of the present invention, there is provided a structural color body configured by combining a plurality of structural color portions that structurally exhibit different colors from each other.

According to a second aspect of the present invention, there is provided the structural color body according to the first aspect, wherein each structural color portion is configured by a great number of cells.

According to a third aspect of the present invention, there is provided the structural color body according to the second aspect, wherein the plurality of structural color portions include a group of red cells that structurally exhibits a red color, a group of green cells that structurally exhibits a green color, and a group of blue cells that structurally exhibits a blue color.

According to a fourth aspect of the present invention, there is provided the structural color body according to the second or third aspect, wherein the plurality of structural color portions include a cell group that does not reflect a visible light, or a cell group that totally reflects the visible light.

According to a fifth aspect of the present invention, there is provided the structural color body according to any one of the second to fourth aspects, wherein the respective cells have an identical shape and an identical size.

According to a sixth aspect of the present invention, there is provided the structural color body according to any one of the second to fifth aspects, wherein the respective cells are adjacently arranged without overlapping each other and without a gap.

According to a seventh aspect of the present invention, there is provided the structural color body according to any one of the second to sixth aspects, further including a non-structural color portion between the cells adjacent to each other.

According to an eighth aspect of the present invention, there is provided the structural color body according to the seventh aspect, wherein a distance from a bottom of a groove of the structural color portion to a vertex of the non-structural color portion is greater than a distance from the bottom of the groove of the structural color portion to a vertex of the groove of the structural color portion.

According to a ninth aspect of the present invention, there is provided the structural color body according to the seventh aspect, wherein the non-structural color portion has a structure that does not reflect a visible light.

According to a tenth aspect of the present invention, there is provided the structural color body according to any one of the first to ninth aspects, being resin molded using a die having a concave-convex inverted shape with respect to the structural color body.

According to the structural color body of the present invention, similar to the tube television being able to express various colors with phosphors of three colors of red, green, and blue, various colors (three or more colors including intermediate color) can be expressed by changing the area ratio of the structural color portion since the structural color body is configured by combining a plurality of structural color portions that structurally exhibit different colors from each other. The decorative effect thus can be further enhanced.

BRIEF DESCRIPTION OF THE DRAWINGS

These and other aspects and features of the present invention will become clear from the following description taken in conjunction with the embodiments thereof with reference to the accompanying drawings, in which:

FIG. 3A is a view schematically showing a step of manufacturing one part of the structural color body of FIG. 2;

FIG. 3B is a view showing a step following FIG. 3A;

FIG. 3C is a view showing a step following FIG. 3B;

DETAILED DESCRIPTION OF THE INVENTION

Figure 1:
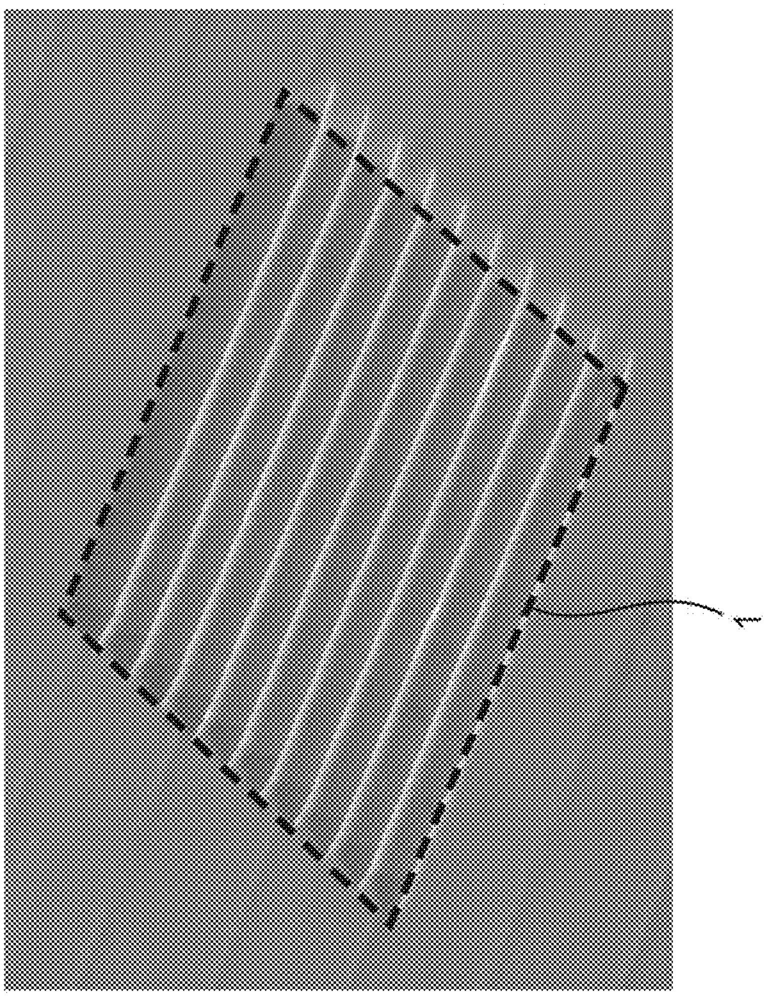
FIG. 1 is a perspective view of a single cell of a structural color body according to a first embodiment of the present invention.

Before the description of the present invention proceeds, it is to be noted that like parts are designated by like reference numerals throughout the accompanying drawings.

Embodiments of the present invention will be described below with reference to the drawings.

<<First Embodiment>>

A structure of a structural color body according to a first embodiment of the present invention will be described. The structural color body according to the first embodiment of the present invention is configured by combining a plurality of (three herein by way of example) structural color portions that structurally exhibit different colors from each other. Each structural color portion is configured by a great number of single cells. FIG. 1 is a perspective view showing a single cell of the structural color body according to the first embodiment of the present invention.

In FIG. 1, the single cell 1 positioned at a portion surrounded with a broken line is configured to structurally exhibit a single color using physical phenomena such as reflection, interference, diffraction, and scattering of light. Specifically, the single cell 1 has a structure in which a plurality of grooves of a predetermined depth dimension are regularly formed at a predetermined pitch in a base material of the structural color body, and is configured to structurally exhibit color by reflecting, interfering, diffracting, or scattering a light of a specific wavelength with the plurality of grooves. In this type of single cell 1, the single cell 1 can exhibit an arbitrary color by changing the arrangement pitch of the groove. The structure of the single cell 1 is not limited to such structure, and other structures may be adopted as long as the single cell 1 can structurally exhibit a single color.

The single cell 1 is a portion corresponding to one pixel when assuming the structural color body according to the first embodiment as one screen. Thus, a size of the single cell 1 is preferably small as possible with respect to a size of the structural color body as this leads to increase in resolution. Specifically, the size of the single cell 1 is preferably smaller than or equal to 250 μm angle. In the first embodiment, the single cell 1 has a size of about 30 μm angle.

When using the structural color body as an outer package component of a large structural object to be installed outside, troubles do not arise in decorative property even if the size of the single cell 1 is large (e.g., even if 10 mm angle). If the size of the single cell 1 is smaller than a wavelength of a visible light, however, the structural color body does not structurally exhibit color. Thus, the size of the single cell 1 is greater than or equal to about 1 μm.

Figure 2:
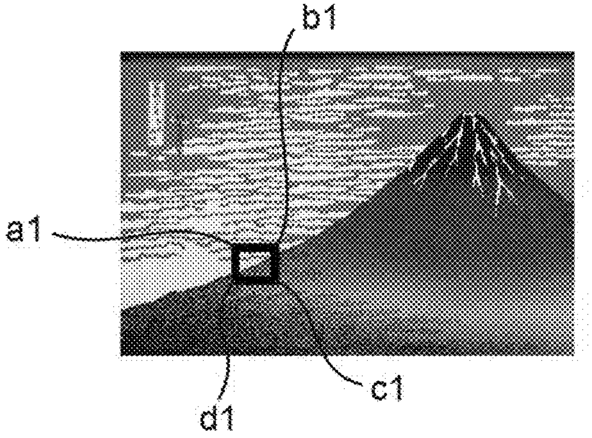
FIG. 2 is a plan view of the structural color body according to the first embodiment of the present invention.

FIG. 2 is a plan view of the structural color body according to the first embodiment configured by combining a great number of single cells 1 of FIG. 1. FIGS. 3A to 3C are views schematically showing steps of manufacturing the structural color body of FIG. 2. Here, the size of the single cell is set very small with respect to the entire size of the structural color body, as described above. In FIGS. 3A to 3C, a region surrounded with a solid line connecting points a1, b1, c1, and d1 of FIG. 2 is shown in an enlarged manner.

The structural color body according to the first embodiment is manufactured as below.

First, a desired pattern shown in FIG. 2 is color separated into three colors of red, green, and blue.

Then, to which position to form the red cell R, which is the single cell that structurally exhibits red, the green cell G, which is the single cell that structurally exhibits green, and the blue cell B, which is the single cell that structurally exhibits blue is designed based on the information obtained by the color separation.

As shown in FIGS. 3A to 3C, the red cell R, the green cell G, and the blue cell B are formed at the designed positions in order. It can be recognized that the red cell R, the green cell G, and the blue cell B are also formed in a manner shown in FIGS. 3A to 3C in regions other than the region surrounded with the solid line connecting the points a1, b1, c1, and d1. An order of forming the red cell R, the green cell G, and the value cell B is not particularly limited, and the cells may be formed in any order.

In the above manner, there is manufactured the structural color body according to the first embodiment including, as a plurality of structural color portions, a group of red cells R that structurally exhibits red, a group of green cells G that structurally exhibits green, and a group of blue cells B that structurally exhibits.

According to the first embodiment, the structural color body is configured by combining the cells of three colors of the red cell R, the green cell G, and the blue cell B, without using pigments such as paint and dye, and thus various colors (three or more colors including intermediate color) can be expressed by changing the area ratio of such cells. A decorative effect thus can be further enhanced. This is the same as the tube television being able to express various colors with phosphors of three colors of red, green, and blue. In the first embodiment, the red cell R, the green cell G, and the blue cell B are formed so as not to overlap each other.

The present invention is not limited to the first embodiment, and may be implemented in various other modes. For instance, an example of configuring the structural color body by combining the cells of three colors of the red cell R, the green cell G, and the blue cell B has been described in the first embodiment, but the present invention is not limited thereto. The structural color body may be configured using a cell that structurally exhibits a color other than the three colors, a cell that does not reflect a visible light convenient for expressing black, a cell that totally reflects a visible light convenient for expressing white, and the like. The decorative effect thus can be further enhanced. The cells of three colors do not need to be combined, and the structural color body may be configured by combining the cells of two colors. The manufacturing cost thus can be suppressed.

Figure 4A:
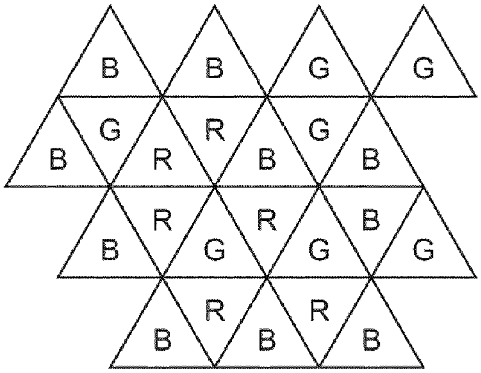
FIG. 4A is a view showing a first variant of the shape of the single cell.
Figure 4B:
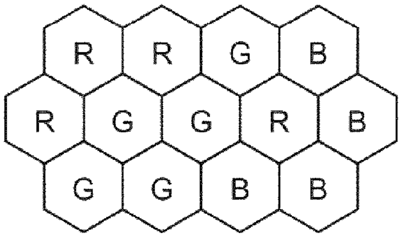
FIG. 4B is a view showing a second variant of the shape of the single cell.
Figure 4C:
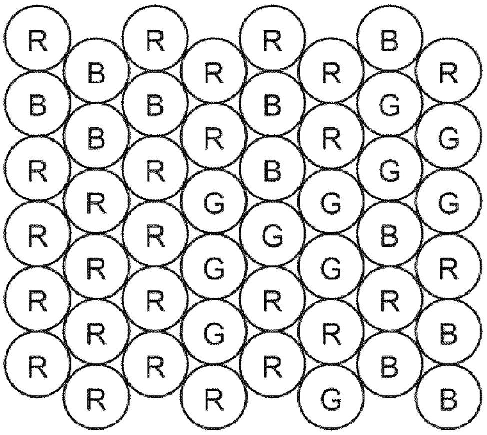
FIG. 4C is a view showing a third variant of the shape of the single cell.

The shape of each cell R, G, B is shown as a square in FIG. 3A to FIG. 3C, but the present invention is not limited thereto. For instance, the shape may be a triangle as shown in FIG. 4A, a hexagon as shown in FIG. 4B, or a circle as shown in FIG. 4C. Each cell R, G, B preferably has an identical shape and an identical size. The intermediate color thus can be easily expressed by combining each cell R, G, B, and the design change can be facilitated, whereby the versatility can be enhanced. Each cell R, G, B preferably has a shape that can be adjacently arranged without overlapping each other and without a gap, as shown in FIG. 4A and FIG. 4B. The color exhibiting efficiency thus can be increased.

The structural color portion is configured by a great number of single cells 1 in the first embodiment, but the present invention is not limited thereto. For instance, the structural color portion may be configured with one single cell 1. In this case as well, the decorative effect can be enhanced compared to the conventional structural color body.

<<Second Embodiment>>

Figure 5:
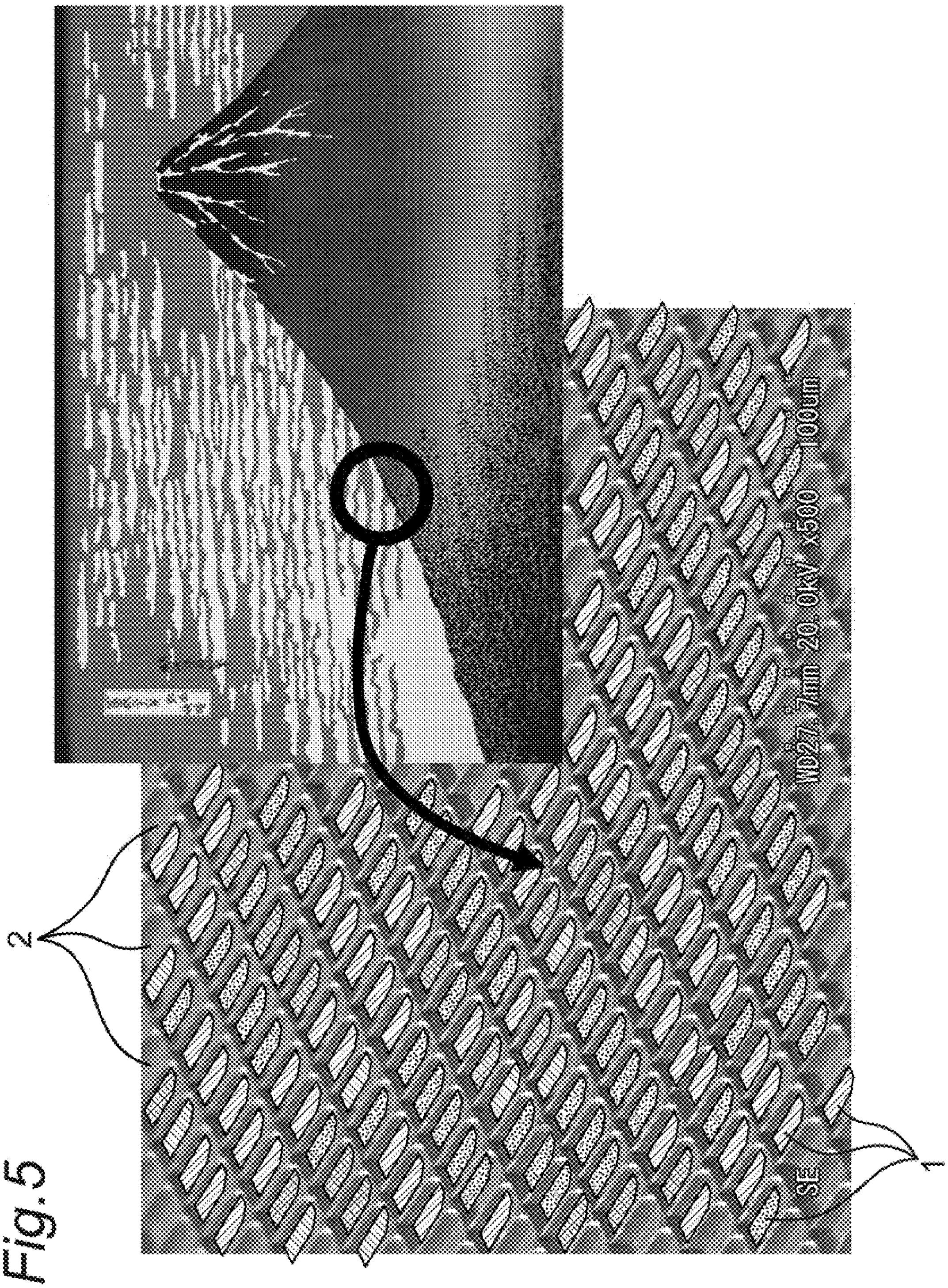
FIG. 5 is an explanatory view showing a configuration of a structural color body according to a second embodiment of the present invention.
Figure 6A:
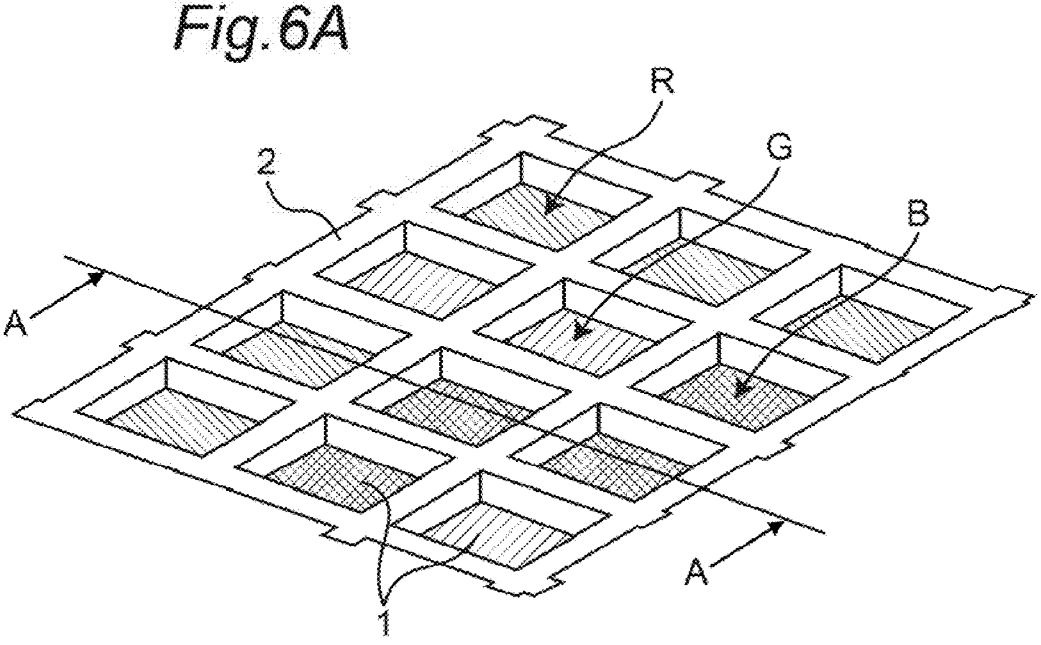
FIG. 6A is a perspective view schematically showing a basic configuration of the structural color body according to the second embodiment of the present invention.
Figure 6B:
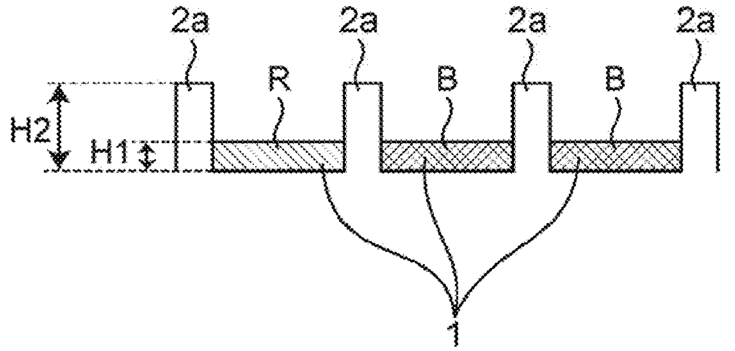
FIG. 6B is a cross-sectional view taken along line A-A of FIG. 6A.

A structural color body according to a second embodiment of the present invention will be described. FIG. 5 is an explanatory view showing a configuration of a structural color body according to the second embodiment of the present invention. FIG. 6A is a perspective view showing a basic configuration of the structural color body according to the second embodiment of the present invention, and FIG. 6B is a cross-sectional view taken along line A-A of FIG. 6A. The structural color body according to the second embodiment differs from the structural color body of the first embodiment in that a non-structural color portion is arranged between the single cells 1 adjacent to each other.

For instance, when forming the single cell 1 by forming (processing) a plurality of grooves at a predetermined pitch in a base material of the structural color body, a non-processed portion (portion not formed with the groove) may form particularly at a boundary portion of the single cells that structurally exhibit different colors from each other. A decorative effect may lower if such non-processed portion occurs at random.

Thus, in the structural color body according to the second embodiment, the non-structural color portion 2 serving as the non-processed portion is intentionally arranged at the entire periphery of each single cell 1, as shown in FIGS. 5 and 6A. This suppresses the lowering of the decorative effect that arises when the non-processed portion occurs at random. The blur of individual color can be reduced and the purity of the color as a simple color can be increased by having each single cell 1 as an independent configuration. Therefore, advanced color expression can be realized, and the decorative effect can be further enhanced In the second embodiment, the structural color of the single cell 1 can be more effectively recognized, and the decorative effect can be further enhanced by preventing a vertex 2*a* of the non-structural color portion 2 from reflecting the visible light.

Figure 7:
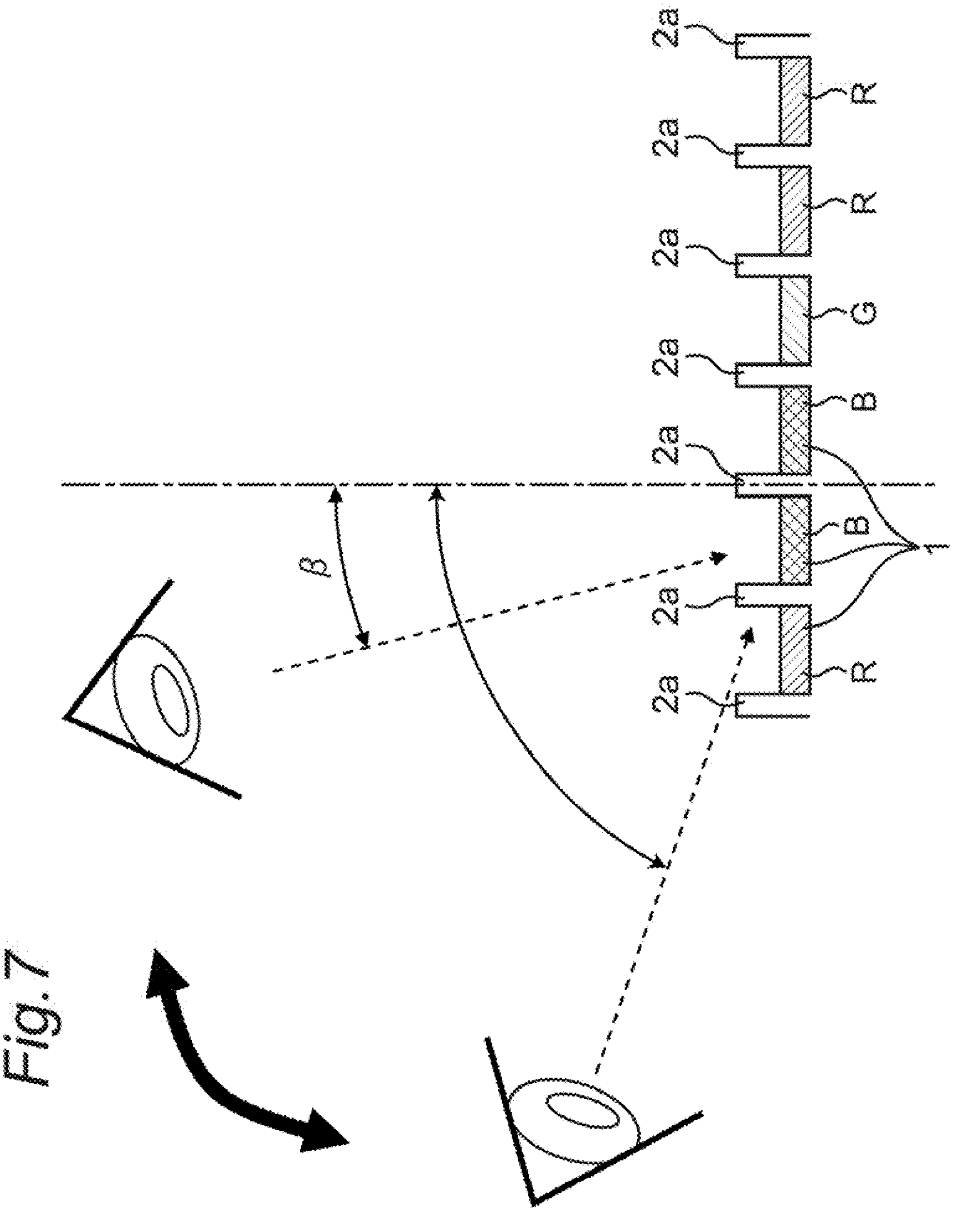
FIG. 7 is an explanatory view showing a relationship of a line of sight and an uprising wall of a non-structural color portion when the structural color body according to the second embodiment of the present invention is seen from different field angles.

In the second embodiment, the non-structural color portion 2 is formed such that the vertex 2*a* is higher than the single cell 1, as shown in FIG. 6B. In other words, a distance H2 from a bottom of the cell 1 to the vertex 2*a* of the non-structural color portion 2 is greater than a distance H1 from the bottom of the cell 1 (groove of structural color portion) to a vertex of the cell 1. Thus, when the structural color body according to the second embodiment is seen from a diagonal direction, as shown in FIG. 7, a position where the single cell 1 can be seen and a position where the single cell 1 cannot be seen exist due to the height of an uprising wall of the non-structural color portion 2. In other words, the single cell 1 can be seen at a position of small field angle β, whereas the single cell 1 is shielded by the uprising wall of the non-structural color portion 2 and cannot be seen at a position of large field angle β. Therefore, the field angle β at which the single cell 1 can be seen can be controlled by adjusting the height of the uprising wall of the non-structural color portion 2. The advanced color expression thus can be realized, and the decorative effect can be further enhanced.

Figure 8:
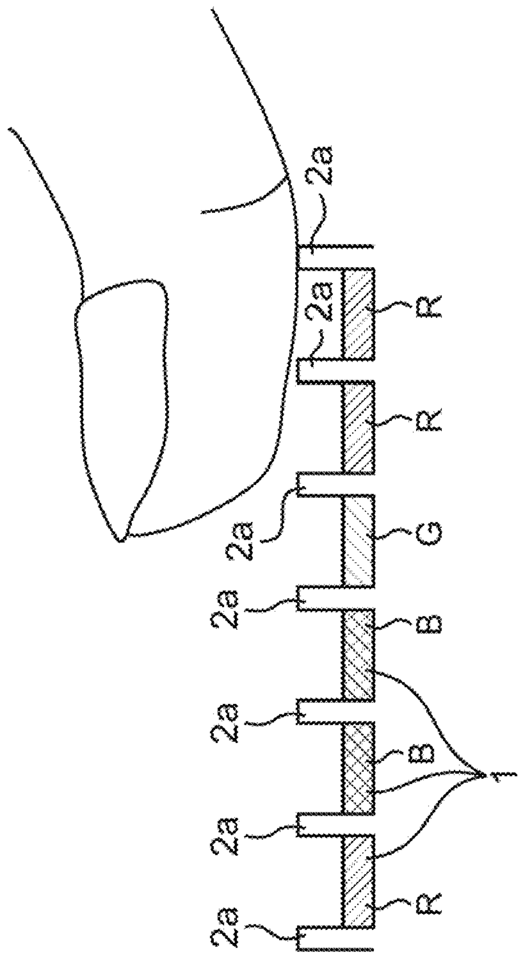
FIG. 8 is an explanatory view showing a state when the structural color body according to the second embodiment of the present invention is touched with hand.

As shown in FIG. 8, the uprising wall of the non-structural color portion 2 is useful in preventing the hand from directly touching the single cell 1 when a surface of the structural color body according to the second embodiment is touched with hand. This prevents the single cell 1 from being damaged or getting dirty, and suppresses the lowering of the decorative effect through long-period use.

The structural color body according to the second embodiment can be manufactured by being resin molded using a die having a concave-convex inverted shape with respect to the structural color body. A great number of structural color bodies thus can be easily obtained and inexpensively manufactured by using the die. The present invention is not limited thereto, and the structural color body according to the second embodiment may be manufactured by directly processing the base material of the structural color body.

Figure 9:
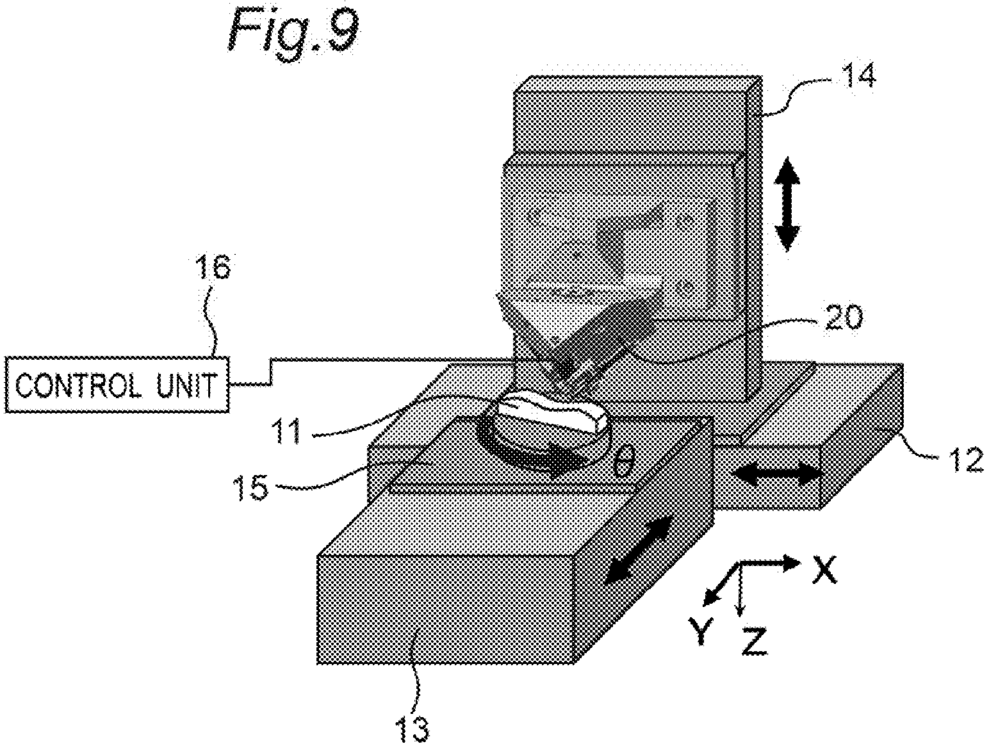
FIG. 9 is a perspective view showing a configuration of a processing device for forming grooves in a die.
Figure 10:
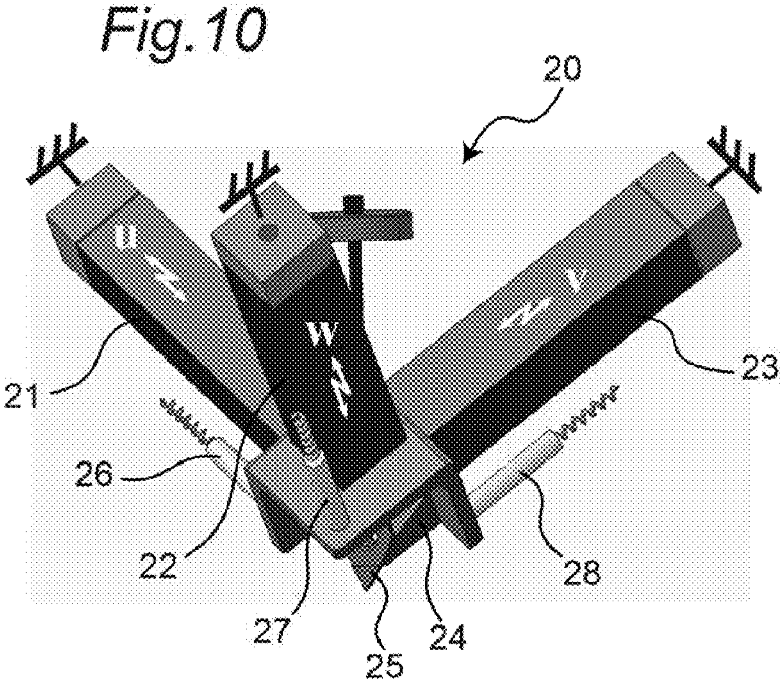
FIG. 10 is a perspective view of a triaxial tool unit arranged in the processing device of FIG. 9.

The manufacturing method of the die used to manufacture the structural color body according to the second embodiment will now be described. FIG. 9 is a perspective view showing a configuration of a processing device for forming grooves in the die. FIG. 10 is a perspective view of a triaxial tool unit arranged in the processing device of FIG. 9.

The processing accuracy of nanometer order is desired for the processing of the grooves to the die since the structural color body according to the second embodiment is configured by combining a great number of microscopic single cells 1 of 30 μm angle. Mechanically processing the grooves of the die using the processing device described below is not necessarily preferred due to issues such as increase of the processing time and abrasion of the tool, but has an advantage in that the design change is easy.

The processing device shown in FIG. 9 is an ultra-delicate processing device of four-axes (X, Y, Z, θ) control operable at a resolution of 1 nm. The processing device includes a triaxial tool unit 20, and each table 12 to 14 for relatively moving the triaxial tool unit 20 with respect to a processing object 11 in a triaxial (X, Y, Z axes) direction orthogonal to each other. Each table is configured by an X-axis table 12 for moving the triaxial tool unit 20 in the X axis direction, a Y-axis table 13 for moving the triaxial tool unit 20 in the Y axis direction, and a Z-axis table 14 for moving the triaxial tool unit 20 in the Z axis direction. The processing device includes a rotary stage 15 that causes the triaxial tool unit 20 to relatively circulate with respect to the processing object 11. The triaxial tool unit 20, each table 12 to 14, and the rotary stage 15 are connected to the control unit 16. The operation unit 16 controls the operations thereof. The control unit 16 is configured to cause the triaxial tool unit 20 to perform a predetermined operation based on a program stored in advance when each table 12 to 14 and the rotary stage 15 reach a predetermined position. The groove processing operation of the processing device is performed by the triaxial tool unit 20.

Similar to the processing device, the triaxial tool unit 20 is configured to be operable at the resolution of 1 nm. As shown in FIG. 10, the triaxial tool unit 20 includes piezoelectric elements 21 to 23 serving as actuators operating in a triaxial (u, v, w) direction orthogonal to each other. A tool (e.g., diamond tool) 25 is attached to an intersection of the three piezoelectric elements 21 to 23 by way of a tool holder 24. The triaxial tool unit 20 includes three gap sensors 26 to 28 for the purpose of measuring an operation displacement of each piezoelectric element 21 to 23. Specifically, each gap sensor 26 to 28 measures the displacement of the tool holder 24 to which the tool 25 is attached. The three gap sensors 26 to 28 are arranged such that the extending lines thereof intersect at one point, where a distal end of the tool 25 is positioned at the intersection. The three gap sensors 26 to 28 are arranged such that an Abbe error becomes a minimum.

Figure 11:
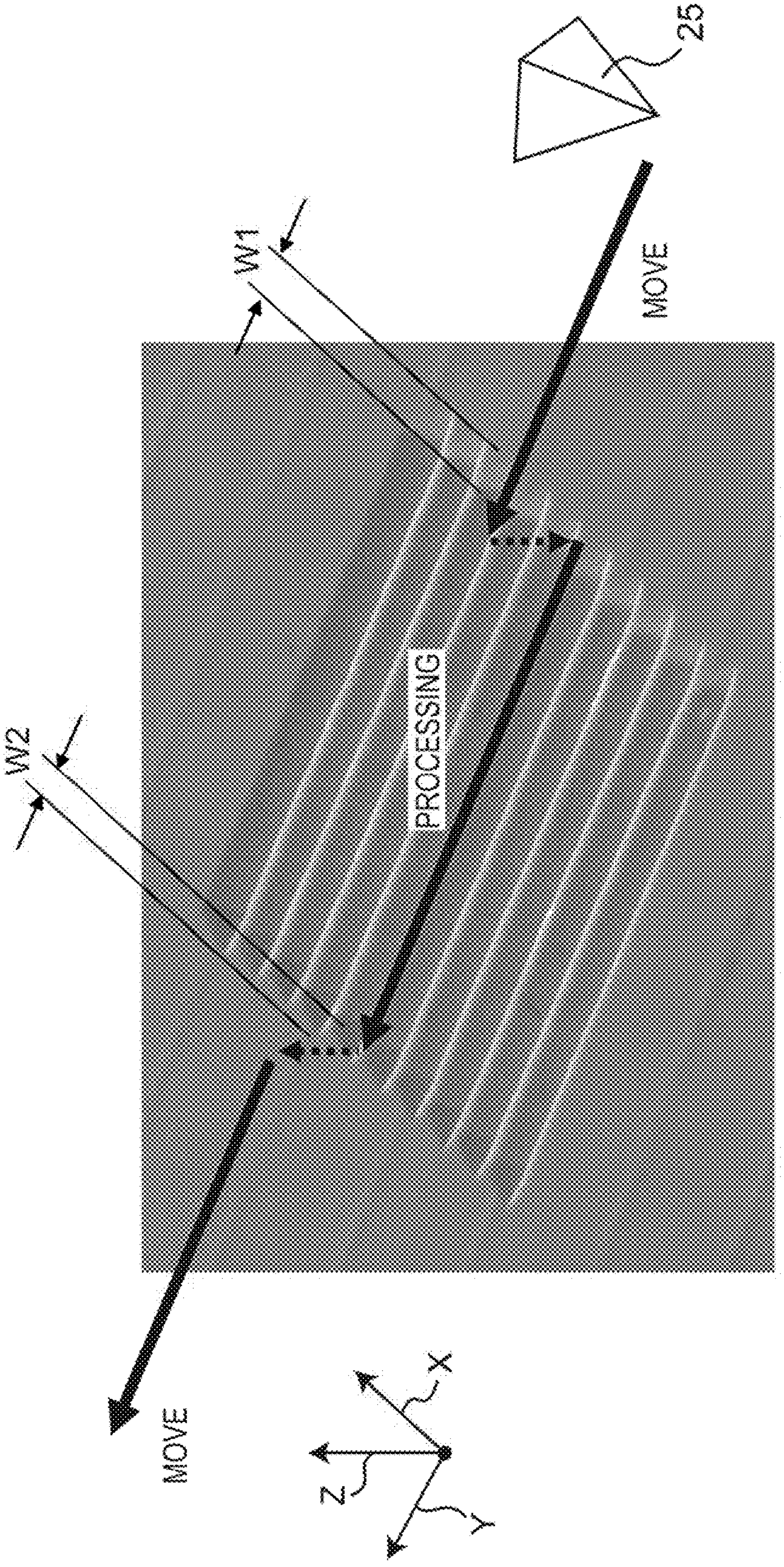
FIG. 11 is a schematic explanatory view showing an operation of processing the grooves in the die using the processing device of FIG. 9.

FIG. 11 schematically shows the operation of processing grooves in the die using the processing device having the above configuration. The grooves of the die are used to form convex portions between the adjacent grooves of the single cell 1, and needless to say, the convex portions between the adjacent grooves of the die are used to form the grooves of the single cell 1.

The following operations are performed to process the grooves in the die as shown in FIG. 11.

The processing operation of the grooves to the die is performed under the control of the control unit 16 based on the NC program stored in advance.

First, the Y-axis table 13 is driven to move the tool 25 in the Y axis direction up to an upper side of a groove processing start position.

Then, the Z-axis table 14 is driven to lower the tool 25 until contacting the die.

The Y-axis table 13 is then driven to move the tool 25 in the Y axis direction up to a groove processing end position. One groove is thereby formed in the die.

The Z-axis table 14 is then reverse driven to evacuate the tool 25 to an upper side of a groove processing end position.

The Y-axis table 13 is then driven to return the tool 25 to the original position.

The X-axis table 12 is then driven to move the tool 25 in the X axis direction by a predetermined distance. Needless to say, the predetermined distance influences the color to be exhibited by the single cell 1.

A plurality of grooves for forming the single cell 1 are formed in the die by repeating the above operations.

As shown in FIG. 11, seams having widths W1, W2 are formed at both ends of the grooves of the die formed in the above manner, that is, the entrance side (groove processing start side) and the exit side (groove processing end side) of the tool 25. The widths W1, W2 of the seams are about 5 μm in the processing by the processing device. Such seams may lower the decorative effect in the structural color body having the configuration in which the single cells 1 are adjacent to each other without interposing the non-structural color portion 2, as in the first embodiment.

The processing method that does not form the seams will be described below.

Figure 12A:
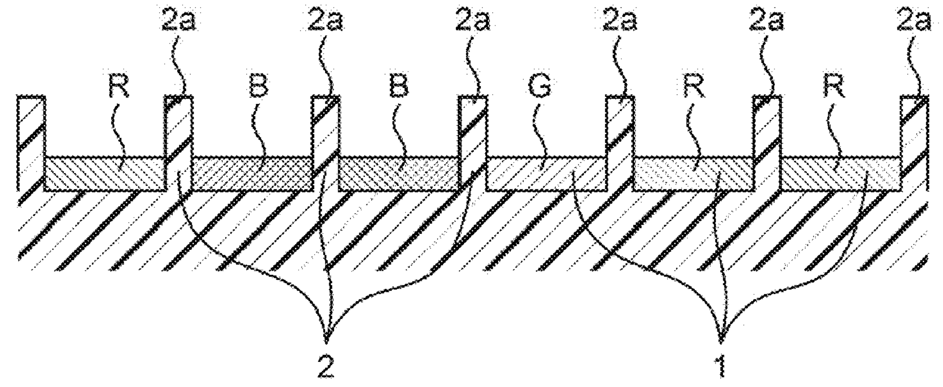
FIG. 12A is a schematic cross-sectional view of the structural color body according to the second embodiment of the present invention.
Figure 12B:
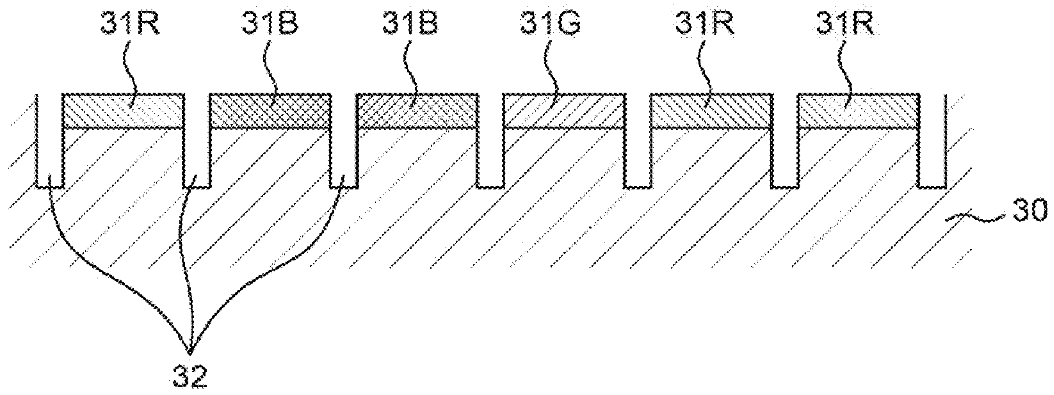
FIG. 12B is a schematic cross-sectional view of the die for processing the structural color body of FIG. 12A.

FIG. 12A is a schematic cross-sectional view of the structural color body according to the second embodiment of the present invention. FIG. 12B is a schematic cross-sectional view of the die for processing the structural color body of FIG. 12A. As apparent from FIGS. 12A and 12B, a die 30 is formed to include the convex portion 31R, 31B, or 31G at the position corresponding to the single cell 1 of the structural color body, and to include the concave portion 32 at the position corresponding to the non-structural color portion 2. The convex portion 31R processes the red cell R, the convex portion 31B processes the blue cell B, and the convex portion 31G processes the green cell G. The processing method of the concave portion 32 is not particularly limited, and machine processing such as shaper processing and end mill processing, laser processing, and the like may be used.

Figure 13:
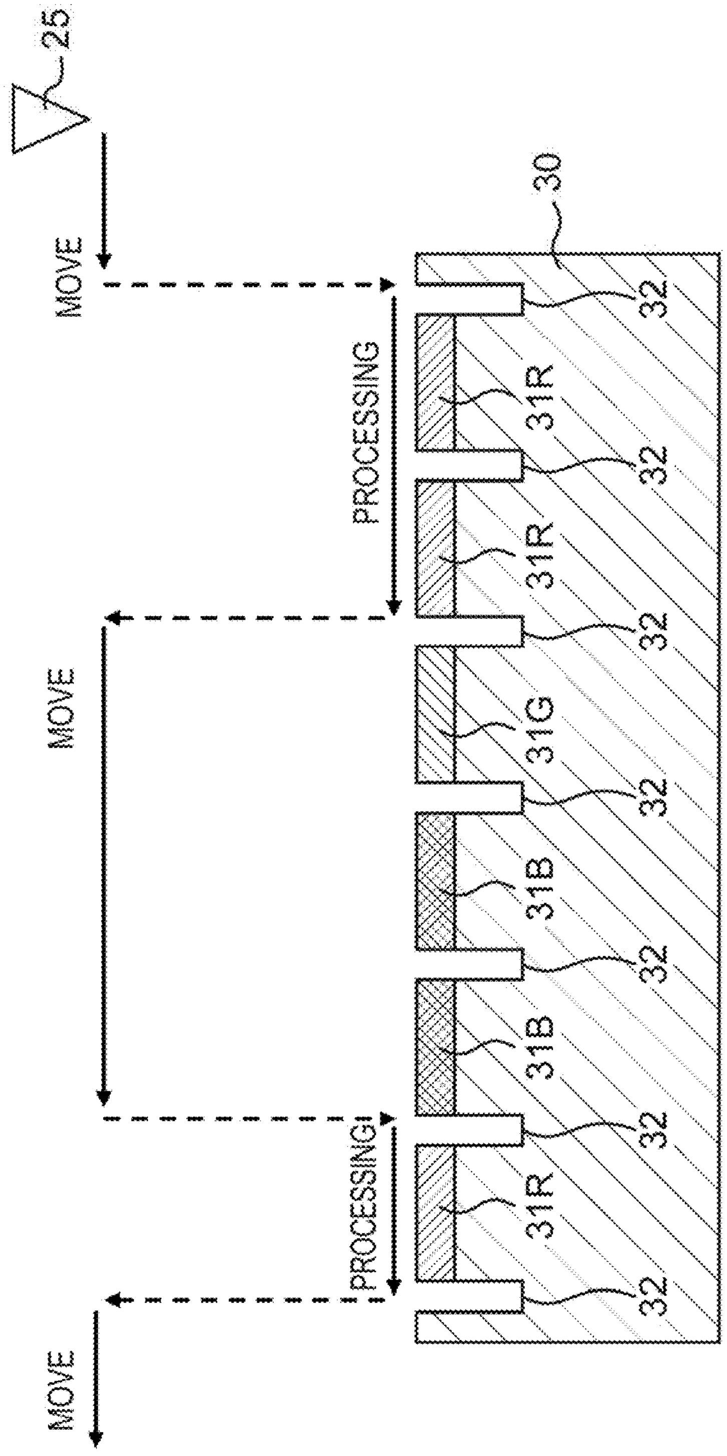
FIG. 13 is an explanatory view showing a movement timing of a tool in time of processing of a red cell R.
Figure 14:
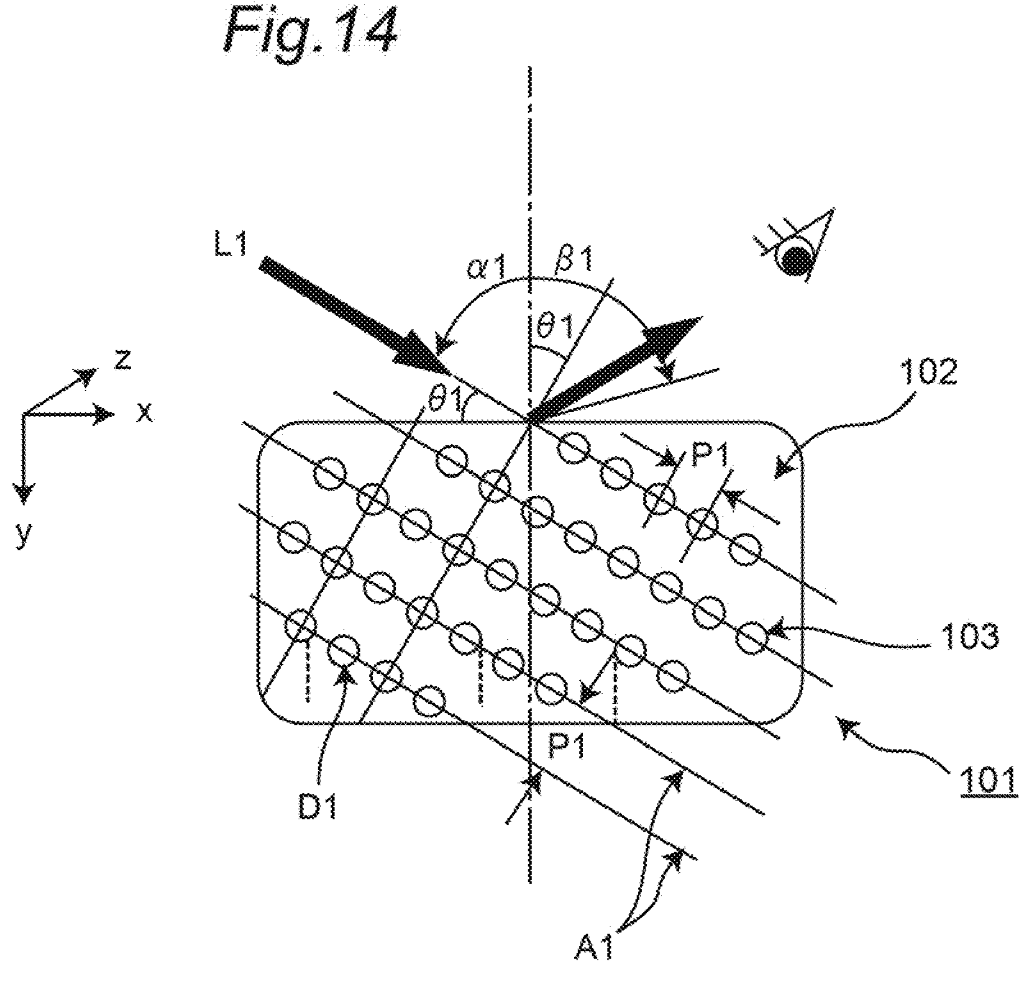
FIG. 14 is a cross-sectional view of a conventional structural color body.

FIG. 13 is an explanatory view showing a movement timing of the tool 25 (drive timing of the Y-axis table 13 and the Z-axis table 14 herein) in time of processing of the red cell R. As apparent from FIG. 13, a position of moving the tool 25 up and down is a position corresponding to the concave portion 32. Thus, the height of the tool 25 can be held constant while the tool 25 is processing the convex portion 31R, so that a trace of the tool 25 moved up and down, that is, the seam can be eliminated.

In the above description, the processing device or the ultra-delicate machine processing device is used to process the grooves in the die, but the present invention is not limited thereto. For instance, processing technique applied with the laser processing, and the lithography technique of the semiconductor may be used.

It is to be noted that, by properly combining the arbitrary embodiments of the aforementioned various embodiments, the effects possessed by them can be produced.

The structural color body according to the present invention is useful as an outer package component of an electrical device such as camera and television as the decorative effect can be further enhanced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application No. 2009-119584 filed on May 18, 2009 including specification, drawing and claims are incorporated herein by reference in its entirety.

The invention claimed is:

1. A structurally colored body that exhibits color using interference, diffraction and scattering of light, and without using pigments including colorants and dyes, the structurally colored body being configured by a plurality of cells, each cell having a plurality of grooves so as to structurally exhibit a single color, wherein the cells are adjacently arranged without overlapping each other, each groove has a depth in a direction perpendicular to a surface of the structurally colored body, a non-structurally colored portion is arranged between adjacent cells, the non-structurally colored portion having an uprising wall which extends in the direction perpendicular to the surface of the structurally colored body, and for each cell, a distance H2 from a bottom of the grooves of the cell to a vertex of the non-structurally colored portion is greater than a distance H1 from the bottom of the grooves of the cell to a vertex of the grooves of the cell, and the distances H1 and H2 are measured in the same direction, whereby the uprising wall prevents a hand from directly touching the grooves of the cell when the surface of the structural colored body is touched with the hand.

2. The structurally colored body according to claim 1, wherein the plurality of cells include a group of red cells that structurally exhibit a red color, a group of green cells that structurally exhibit a green color, and a group of blue cells that structurally exhibit a blue color.

3. The structurally colored body according to claim 1, wherein the pluralities of cells include cells that do not reflect a visible light, or cells that totally reflect the visible light.

4. The structurally colored body according to claim 1, wherein the cells each have an identical shape and an identical size.

5. The structurally colored body according to claim 1, wherein the non-structurally colored portion has a structure that does not reflect a visible light.

* * * * *